(12) United States Patent
Charny et al.

(10) Patent No.: US 7,234,880 B1
(45) Date of Patent: Jun. 26, 2007

(54) INTERNAL PLUGGABLE OPTICAL MODULE

(75) Inventors: Mikhail Charny, Derwood, MD (US); Andrew Mark Saunders, Gaithersburg, MD (US)

(73) Assignee: Acterna L.L.C., Germantown, MD (US)

( * ) Notice: Subject to any disclaimer, the term of this patent is extended or adjusted under 35 U.S.C. 154(b) by 0 days.

(21) Appl. No.: 11/535,595

(22) Filed: Sep. 27, 2006

Related U.S. Application Data

(60) Provisional application No. 60/757,235, filed on Jan. 9, 2006.

(51) Int. Cl.
*G02B 6/36* (2006.01)
(52) U.S. Cl. ...................................... 385/92
(58) Field of Classification Search .................. 385/88, 385/89, 92–94, 76–77, 14, 53, 49
See application file for complete search history.

(56) References Cited

U.S. PATENT DOCUMENTS

| | | |
|---|---|---|
| 5,901,263 A | 5/1999 | Gaio et al. .................... 385/92 |
| 6,666,484 B1 | 12/2003 | Branch et al. .............. 292/128 |
| 6,746,264 B1 | 6/2004 | Branch et al. .............. 439/352 |
| 6,883,971 B2 | 4/2005 | Chiu et al. .................... 385/53 |
| 6,890,206 B2 | 5/2005 | Distad et al. ............... 439/372 |
| 6,916,123 B2 | 7/2005 | Kruger et al. ................ 385/92 |
| 6,935,882 B2 | 8/2005 | Hanley et al. .............. 439/372 |
| 6,943,854 B2 | 9/2005 | Chiu et al. .................... 349/53 |
| 6,974,265 B2 | 12/2005 | Chiu et al. .................... 385/92 |
| 7,004,647 B2 | 2/2006 | Malagrino, Jr. et al. ...... 385/92 |

*Primary Examiner*—Javaid H. Nasri
(74) *Attorney, Agent, or Firm*—Allen, Dyer, Doppelt, Milbrath & Gilchrist, P.A.

(57) ABSTRACT

A pluggable electro-optical module is mounted completely within the housing of a host device, e.g. testing equipment, to protect the module from external forces, such as ESD, dust and impacts. Furthermore, an equipment manufacturer can use any form of electro-optical module with any type of optical connector receptor, and adapt the electro-optic module into their optical equipment by using an adaptor cable and an optical connector adaptor, which optically couples the module to their end customer's network regardless of the optical connector on the module or the network cable.

17 Claims, 3 Drawing Sheets

INTERNAL PLUGGABLE OPTICAL MODULE

CROSS-REFERENCE TO RELATED APPLICATIONS

The present invention claims priority from U.S. Patent Application No. 60/757,235 filed Jan. 9, 2006, which is incorporated herein by reference for all purposes.

TECHNICAL FIELD

The present invention relates to a pluggable electro-optical module, and in particular to a pluggable electro-optical module mounted completely within the housing of a host device, such as mobile testing equipment.

BACKGROUND OF THE INVENTION

A conventional pluggable electro-optical module 1, e.g. a transceiver, is guided into a cage or a guide rails 2, which is mounted on the edge of a printed circuit board 3, through an opening 4 in a faceplate 5 enclosing a host device. An electrical connector 6 on the electro-optical module 1, extending from housing 7, is guided into position by the cage 2 with a mating electrical connector 8 positioned in the cage 2 and electrically connected to circuits on the printed circuit board 3. Accordingly, the front end of the optical module 1, which includes an optical connector 9, protrudes from the faceplate 5 beyond the wall of the host device making it susceptible to electro-static discharge, impact damage or misalignment from outside sources. Furthermore, externally mounted electro-optical modules limit the type of optical connector that must be used by the customer or they increase the amount of inventory required by the manufacturer to satisfy the different customers' requirements.

Pluggable electro-optical modules used in mobile testing equipment are subjected to much harsher environments, e.g. vans, various customer premises, etc, than typical telecom or datacom modules. Moreover, test equipment is used in different ways to perform different tests in a variety of locations. Accordingly, the optical test signal produced by the test equipment needs to be variable in wavelength, signal strength and data content, and test equipment needs to be adaptable to a variety of connector types. To solve this problem prior art test equipment has included relatively expensive electro-optical modules with added and/or non-standard capabilities. Alternatively, conventional test equipment uses a large number of externally mounted conventional pluggable devices necessitating large inventories of devices to provide the necessary functionality and customer connector requirements with high turn-over rates, due to excessive insertion and removal cycles.

Conventional internally-mounted electro-optical modules are typically soldered or otherwise fixed to the printed circuit board of the host device to provide an electrical connection thereto, while an optical connection is provided by a long pig-tail connection, thereby increasing cost and complexity of fiber routing and decreasing reliability.

An object of the present invention is to overcome the shortcomings of the prior art by providing a pluggable optical module mounted completely within the housing of a host device.

SUMMARY OF THE INVENTION

Accordingly, the present invention an electro-optical system comprising:
a host printed circuit board with a faceplate for mounting in a housing of a host device;
a first cage mounted on the host printed circuit board inside the housing without being directly accessible from outside of the housing when the host printed circuit board is mounted in the host device, the first cage including a first pluggable electrical connector;
a first electro-optical module inserted into the first cage, the module including a first optical receptor, and a second pluggable electrical connector for releasably mating with the first pluggable electrical connector;
a first adaptor cable having a first end with a first optical connector for plugging into the first optical receptor, and a second end with a second optical connector; and
an optical connector adaptor mounted on the faceplate, including a second optical receptor optically coupled with the second optical connector, and a third optical receptor;
whereby an external optical cable connector on an end of an external optical cable optically coupled to an external optical network is pluggable into the third optical receptor of the optical connector adaptor for optically coupling the first electro-optical module to the external optical network.

Another aspect of the present invention relates to the electro-optic module is safely positioned inside a host device without any portion thereof extending outwardly to ensure the module is not damaged by outside forces and the external optical interface of the electro-optical system is more easily cleanable.

Another feature of the present invention allows the addition of an optic coupling between an optic module or plurality of optic modules and a face plate connection or plurality of face plate connections creating a solution where more than one wavelength can be sent to a single face plate connector or light from more than one face plate connector can be sent to one or several modules. This allows the finished product to use less face plate space than would have been possible had all connectors been directly connected at the panel in situations where not all the optic module connections are simultaneously active.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
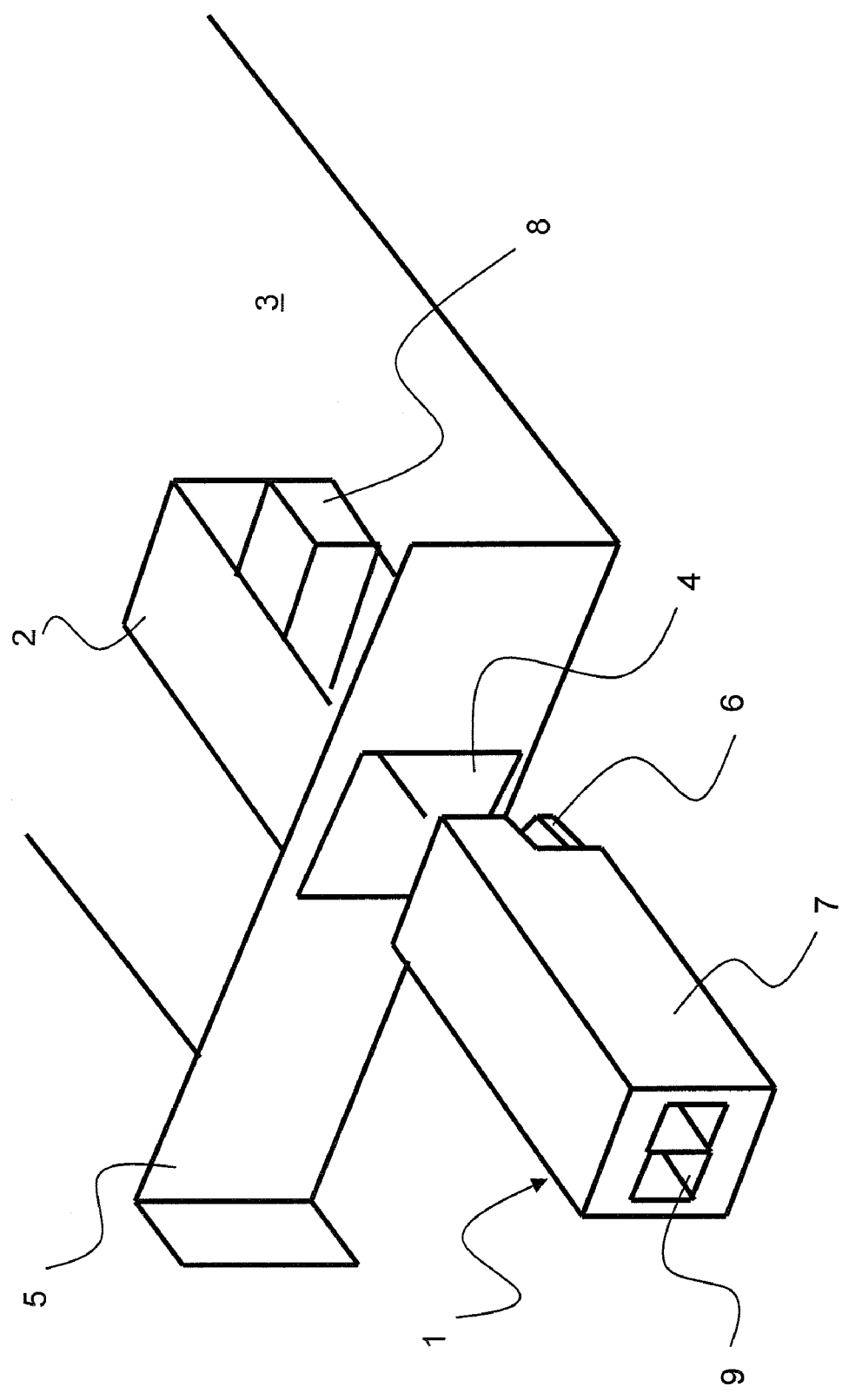
FIG. 1 is an isometric view of a conventional electro-optical module.
Figure 2:
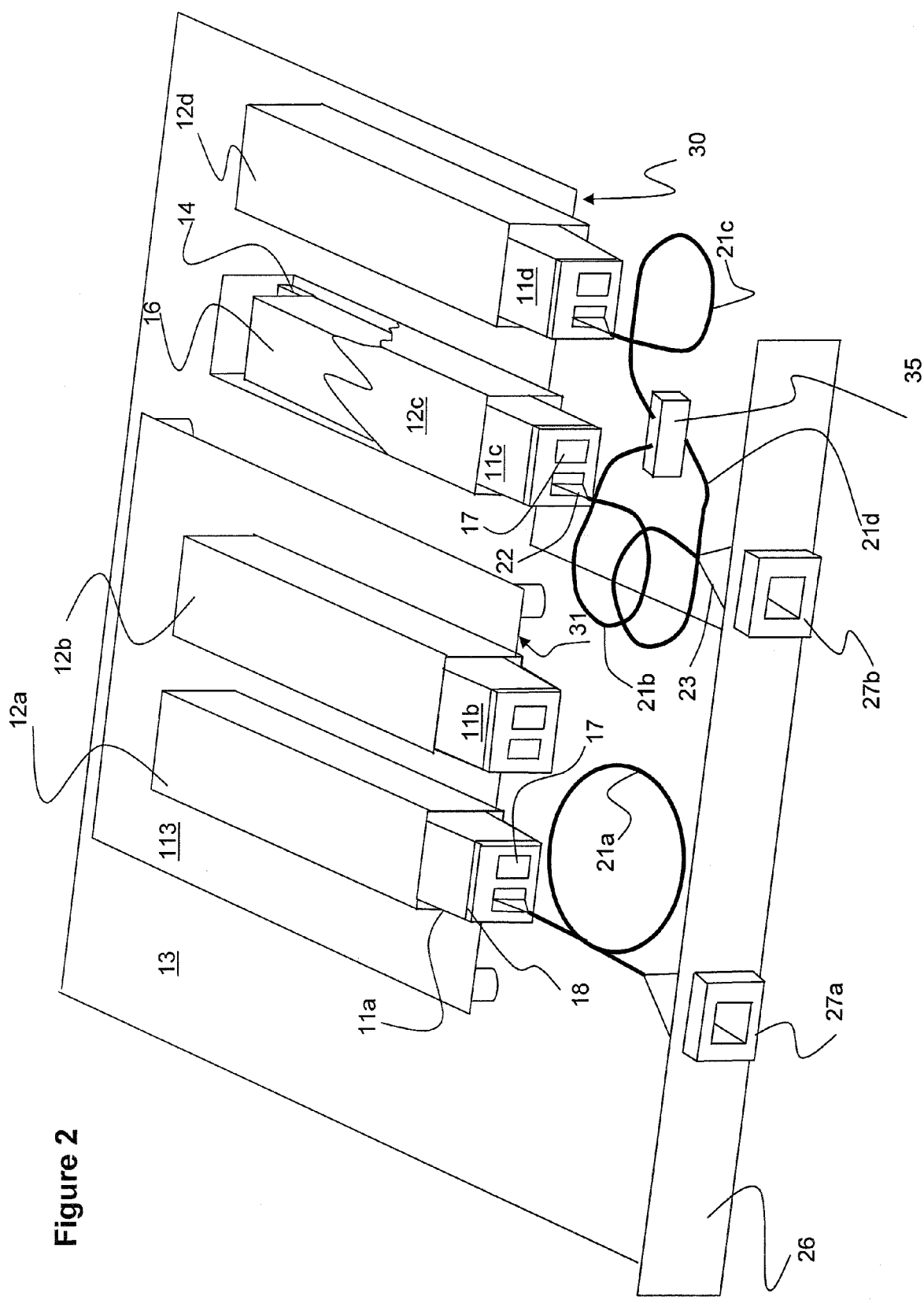
FIG. 2 is an isometric view of an electro-optic module being mounted within a host device.
Figure 3:
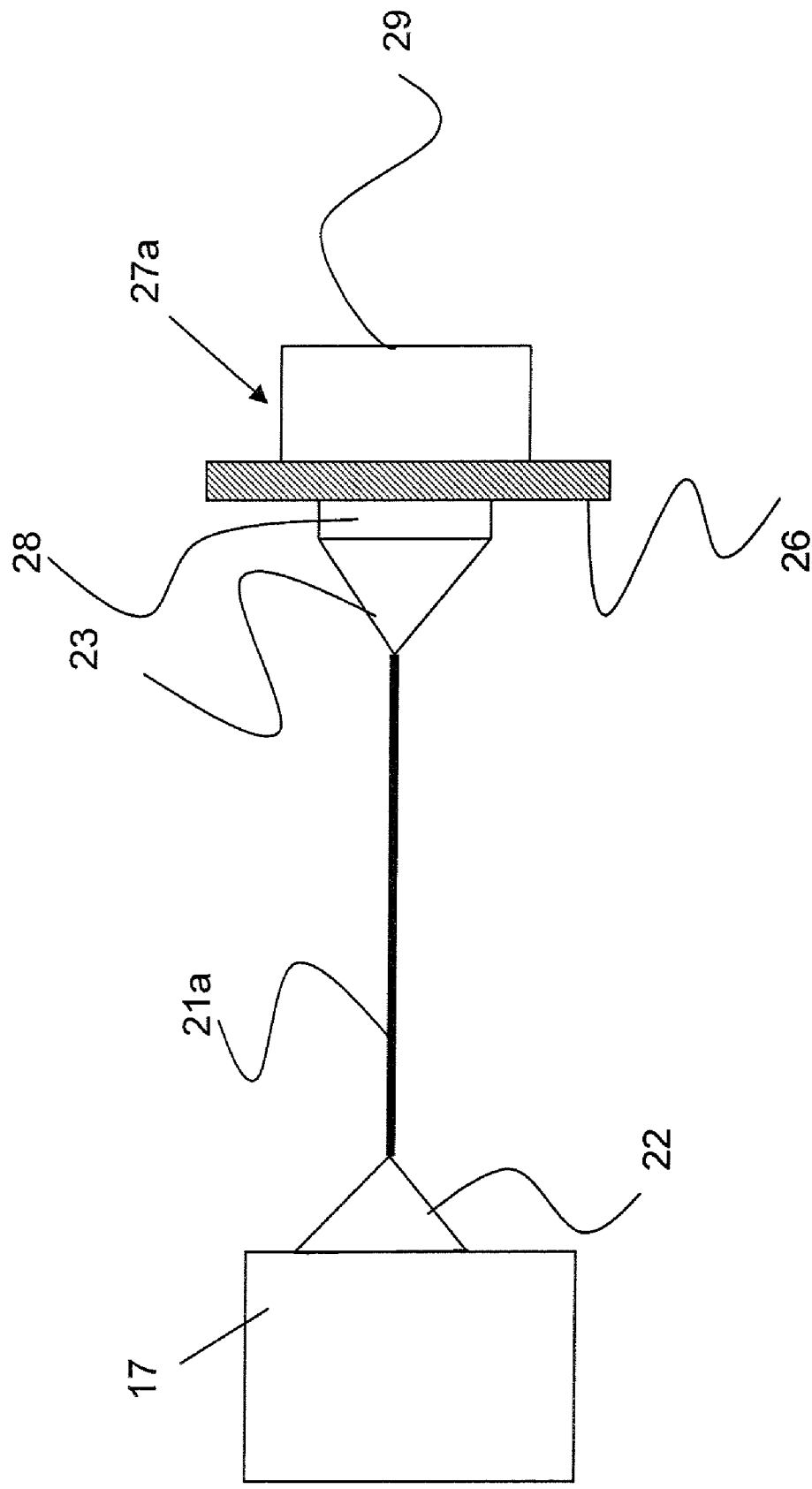
FIG. 3 is a side view of the adaptor cable of FIG. 2 coupled to an optical connector mounted on a faceplate of the host device.

With reference to FIGS. 2 and 3, the electro-optical system according to the present invention includes a plurality of pluggable electro-optical modules 11a to 11d receivable within mounting cages 12a to 12d, respectively, which are fixed onto a host printed circuit board (PCB) 13 for mounting in a host mobile testing device via a permanent electrical connection or via a pluggable electrical connector. The PCB 13 can include various monitoring and control circuitry for the electro-optical modules 11a to 11d as well as the testing equipment for testing optical networks. Each of the electro-optical modules 11a to 11d includes a pluggable electrical connector 14 extending from one end of a housing 16, and an optical connector, in the form of a first optical cable receptor 17, extending from an opposite end thereof. Typically, the pluggable electrical connector 14 is a card edge connector or other commercial connector formed in an end of a printed circuit board disposed within the housing 16. Each of the cages 12a to 12d includes an electrical connector (not shown) for mating with the pluggable electrical connector 14 extending from the housing 16, and can be any suitable cage sized to receive the electro-optical modules 11a to 11d. To facilitate insertion of the electro-optical modules 11c and 11d, the cages 12c and 12d are mounted on the cut edge 30 of the PCB 13. Alternatively, electro-optical modules 11a and 11b are positioned on an edge 31 of an elevated printed circuit board 113, which is not directly adjacent to the products faceplate 26 or enclosure. Alternatively, or in combination therewith the cages 12a to 12d can be mounted at an acute angle, e.g. 1° to 3°, to the PCB 13 or the cages 12a to 12d can be raised up above the PCB 13 or 113 by spacers to prevent the circuits on the PCB 13 from being damaged during insertion of the module 11. The elevated printed circuit board 113 can also be mounted at an acute angle, e.g. 1° to 3°, to the PCB 13 to facilitate insertion of the modules 11a and 11b and to prevent the circuits on the PCB 13 from being damaged during insertion of the modules 11a and 11b.

Typically, a latching device 18 is mounted on the front end of the housing 16, proximate the first optical cable receptor 17, enabling the electro-optical modules 11a to 11d to be locked in the cages 12a to 12d, respectively, when inserted, and released therefrom when the latching device 18 is manually released. Various latching devices are known in the art including those disclosed in U.S. Pat. Nos. 5,901,263; 6,666,484; 6,746,264; 6,883,971; 6,890,206; 6,916,123; 6,935,882; 6,943,854; 6,974,265; 7,004,647, which are incorporated herein by reference.

With particular reference to FIG. 2, the first optical cable receptor 17 receives a first releasable optical end connector 22 mounted on an end of an adaptor cable 21a. The first releasable optical end connector 22 is selected from one of the standard releasable optical end connector types, e.g. SC or LC, or any other non-standard optical end connector, as required to mate with the optical connector 17. The other end of the adaptor cable 21a includes a second releasable optical end connector 23, which can be the same type as the first end connector 22 or a different type depending on the customer's requirements. A faceplate 26 is mounted on or near an end of the PCB 13 for enclosing the host device when the PCB 13 is mounted therein. Optical connector adaptors 27a and 27b extend through the faceplate 26, and include a second optical cable receptor 28 on one side of the faceplate 26 for receiving the second optical end connector 23, and a third optical cable receptor 29 on the opposite side of the faceplate 26 for receiving a third optical end connector mounted on the end of an optical fiber used in the customer's optical network.

Preferably, the adaptor cables 21a to 21d have a specific length, e.g. 9 to 12 inches, which enable only a single loop to be formed therein between the electro-optical modules 11a to 11d and the optical connector adaptors 27a and 27b or the switch 35. The loop must have a large enough bend radius, which is dependent upon the specific adaptor cable used, to avoid leakage of the optical signals from the core of the adaptor cables 21a to 21d. If the adapter cable 21a to 21d is shorter than the preferred length, then a strain can be placed on the adaptor cables when the cable is too short or alternatively, too small a loop will be formed causing leakage when the cable is just slightly too long. If the adaptor cables 21a to 21d are longer than necessary, the excess fiber is susceptible to damage during assembly and during motion, and may violate their minimum bend radius requirements. Typically, to solve the cable length problem when the cable is much longer than necessary a plurality of loops are provided within optical cables; however, this solution requires fiber management structures to keep the cables in place and added assembly process steps to mount the fiber management structures and the fibers therein.

Accordingly, the manufacturer of the electro-optical system, e.g. the testing device, can utilize any form of electro-optical module with any type of first optical cable receptor 17, and adapt the electro-optic module into the optical network to be tested by using the necessary adaptor cable 21a to 21d and optical connector adaptor 27a and 27b, in particular the second optical cable receptor 29, which matches the third optical end connector of the optical fiber of the optical network to be tested. Moreover, changes on either side of the faceplate 26, e.g. changing the electro-optic module, can be compensated by simply changing the adaptor cable 21 and/or the optical connector adaptors 27a and 27b, rather than the electro-optic module or the existing network. Furthermore, the electro-optic module 11 is safely positioned inside a host device, e.g. testing equipment, without any portion thereof extending outwardly to ensure the module is not damaged by outside forces and the externally accessible connector is more easily cleanable.

FIG. 2 illustrates a heavily populated system in which a plurality of similar and different forms of electro-optical modules 11a to 11d are mounted in a variety of corresponding cages 12a to 12d. A plurality of adaptor cables 21a to 21d optically couple the electro-optical modules 11a to 11d to a plurality of respective optical connector adaptors 27a and 27b mounted on the faceplate 26. Accordingly, a plurality of different electro-optical modules 11a to 11d for sending and receiving optical test signals with various different characteristics, e.g. wavelength, signal strength, and data content, can be positioned adjacent one another, and alternatively plugged into the same optical connector adaptor 27a or 27b with the same or different adaptor cables 21. Preferably, a plurality of the electro-optical modules with different characteristics, e.g. 11c and 11d, are plugged or otherwise connected, e.g. fusion spliced, into an intermediate coupler 35 with adaptor cables 21b and 21c. The coupler 35 is connected to the optical connector adaptor 27b by a single adaptor cable 21d or directly with an optical cable connector or other suitable means. The activation of the electro-optical modules 11c and 11d are alternatively controlled by the control electronics and software of the host testing equipment. In this way, the faceplate 26 can have much fewer access holes, e.g. optical connector adaptors 27a and 27b, than electro-optical modules 11a to 11d, thereby minimizing the passage of EMI therethrough, as well as dust and dirt. Moreover, the faceplate 26 can be universal for all testing devices with a limited number of optical connector adaptors 27a and 27b positioned in predetermined locations, whereby only internal adaptor cables 21a to 21d, electro-optical modules 11a to 11d, and preferably coupler 35 need to be reconfigured depending on the tests required.

We claim:

1. An electro-optical system comprising:
    a host printed circuit board with a faceplate for mounting in a housing of a host device;
    a first cage mounted on the host printed circuit board inside the housing without being directly accessible from outside of the housing when the host printed circuit board is mounted in the host device, the first cage including a first pluggable electrical connector;
    a first electro-optical module inserted into the first cage, the module including a first optical receptor, and a second pluggable electrical connector for releasably mating with the first pluggable electrical connector;
    a first adaptor cable having a first end with a first optical connector for plugging into the first optical receptor, and a second end with a second optical connector; and
    an optical connector adaptor mounted on the faceplate, including a second optical receptor optically coupled with the second optical connector, and a third optical receptor;
    whereby an external optical cable connector on an end of an external optical cable optically coupled to an external optical network is pluggable into the third optical receptor of the optical connector adaptor for optically coupling the first electro-optical module to the external optical network.

2. The optical system according to claim 1, further comprising:
    a second cage mounted on the host printed circuit board inside the housing without being directly accessible from outside of the housing when the host printed circuit board is mounted in the host device, the second cage including a third pluggable electrical connector; and
    a second electro-optical module inserted into the second cage, the second electro-optical module including a fourth pluggable electrical connector for releasably mating with the third pluggable electrical connector, and a fourth optical receptor.

3. The optical system according to claim 2, wherein the first adaptor cable is alternatively pluggable into the first and fourth optical receptors for optically coupling the first or the second electro-optical module to the external optical network.

4. The optical system according to claim 2, further comprising:
    a second adaptor cable having a first end with a third optical connector for plugging into the fourth optical receptor, and a second end; and
    a coupler for receiving the second optical connector and the second end of the second adaptor cable, the coupler being optically coupled with the second optical receptor;
    whereby the first and second electro-optical modules can be alternatively actuated by the host device to receive or launch optical signals via the optical cable adaptor.

5. The optical system according to claim 1, wherein the first adaptor cable has a length, which ensure that only a single loop with a large enough bend radius to prevent leakage therefrom, is formed between the first electro-optical module and the optical connector adaptor to facilitate assembly and eliminate the need for fiber management devices.

6. The optical system according to claim 1, wherein the cage is tilted at an acute angle to the host printed circuit board to facilitate insertion of the electro-optical module into the cage.

7. The optical system according to claim 1, further comprising spacers for raising the cage above the host printed circuit board to facilitate insertion of the electro-optical module into the cage.

8. The optical system according to claim 1, further comprising a raised printed circuit board spaced from the host printed circuit board for supporting the cage above the host printed circuit board to facilitate insertion of the electro-optical module into the cage.

9. The optical system according to claim 1, wherein the cage is mounted proximate an edge of the host circuit board remote from the faceplate to facilitate insertion of the electro-optical module into the cage.

10. A mobile optical network test equipment device for testing external optical networks including external optical cables with external optical cable connectors comprising:
    a host printed circuit board including control and monitoring circuitry for testing optical networks, the host printed circuit board having a faceplate with an access hole;
    a housing having a slot for receiving the host printed circuit board, which is enclosed within the housing by the faceplate;
    a first cage mounted on the host printed circuit board inside the housing without being directly accessible from outside of the housing when the host printed circuit board is mounted in the housing, the first cage including a first pluggable electrical connector;
    a first electro-optical module for insertion into the first cage, the first module including a second pluggable electrical connector for releasably mating with the first pluggable electrical connector, and a first optical receptor;
    a first adaptor cable, having a first end with a first optical connector for plugging into the first optical receptor, and a second end;
    a second cage mounted on the host printed circuit board inside the housing without being directly accessible from outside of the housing when the host printed circuit board is mounted in the housing, the second cage including a third pluggable electrical connector;
    a second electro-optical module for insertion into the second cage, the second module including a fourth pluggable electrical connector for releasably mating with the third pluggable electrical connector, and a second optical receptor;
    a second adaptor cable, having a first end with a second optical connector for plugging into the second optical receptor, and a second end;
    an optical coupler optically coupled to the second ends of the first and second adaptor cables; and
    a first optical connector adaptor mounted in the access hole of the faceplate optically coupled with the optical coupler, and including a third optical receptor for receiving a first external optical cable connector on an end of a first external optical cable from a first external network;
    whereby the first and second electro-optical modules are alternatively actuated by the control circuitry to receive or launch optical signals via the first optical cable adaptor.

11. The device according to claim 10, wherein the first and second electro-optical modules transmit optical signals with different characteristics enabling the external optical network to be tested with and for variable optical signals;

wherein the different characteristics are selected from the group consisting of wavelength, signal strength and data content.

12. The device according to claim 10, further comprising a second optical connector adaptor for optically coupling with the optical coupler, the second optical connector adaptor including a fourth optical receptor for receiving a second external optical cable connector, different from the first external optical cable connector, on an end of a second external optical cable of a second external network, whereby the first optical connector adaptor is replaced with the second optical connector adaptor when the second external optical network is being tested.

13. The optical system according to claim 10, wherein the first adaptor cable has a length, which ensure that only a single loop with a large enough bend radius to prevent leakage therefrom, is formed between the first electro-optical module and the first optical connector adaptor to facilitate assembly and eliminate the need for fiber management devices.

14. The optical system according to claim 10, wherein the first cage is tilted at an acute angle to the host printed circuit board to facilitate insertion of the first electro-optical module into the first cage.

15. The optical system according to claim 10, further comprising spacers for raising the first cage above the host printed circuit board to facilitate insertion of the first electro-optical module into the first cage.

16. The optical system according to claim 10, further comprising a raised printed circuit board spaced from the host printed circuit board for supporting the first cage above the host printed circuit board to facilitate insertion of the first electro-optical module into the first cage.

17. The optical system according to claim 10, wherein the first cage is mounted proximate an edge of the host circuit board remote from the faceplate to facilitate insertion of the first electro-optical module into the first cage.

* * * * *